UNITED STATES PATENT OFFICE.

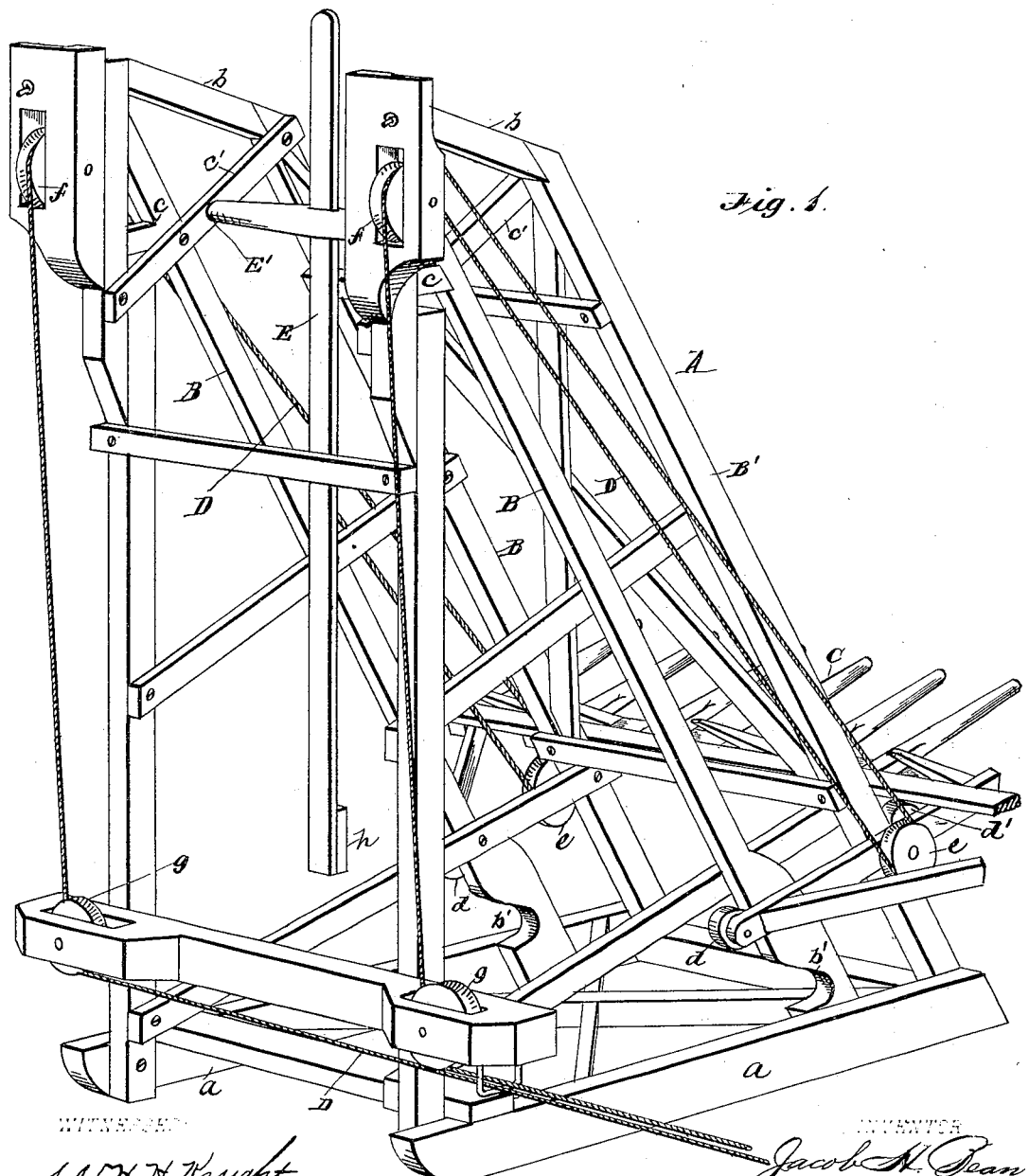

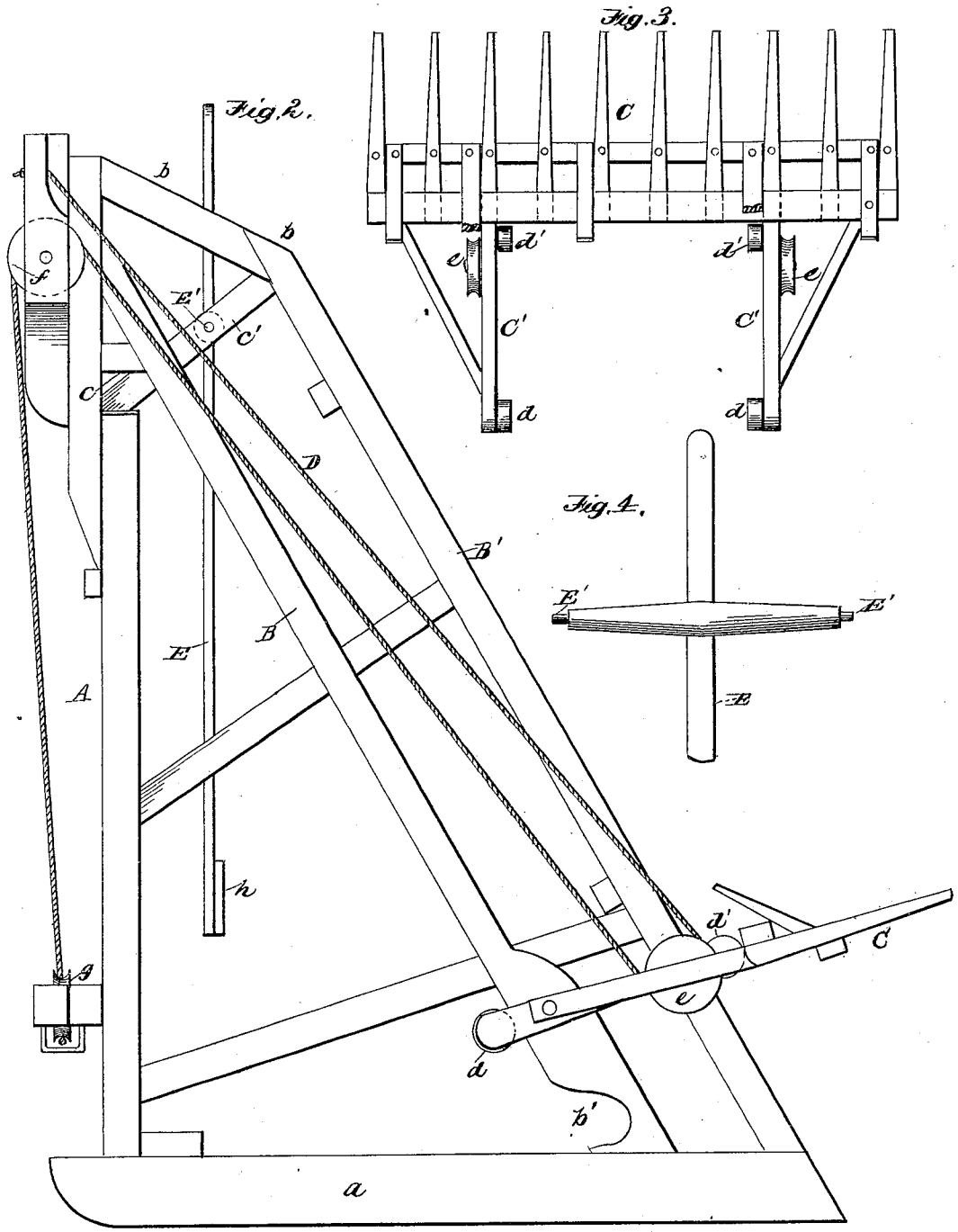

JACOB H. BEAN, OF MACON, ILLINOIS.

HAY-STACKER.

SPECIFICATION forming part of Letters Patent No. 263,464, dated August 29, 1882.

Application filed July 13, 1882. (No model.)

To all whom it may concern:

Be it known that I, JACOB H. BEAN, a citizen of the United States of America, residing at Macon, in the county of Macon and State of Illinois, have invented certain new and useful Improvements in Hay-Stackers, of which the following is a specification, reference being had therein to the accompanying drawings.

This invention relates to improvements in hay or straw stackers, having for its object, among other things, to cause the fork or car which carries the hay or the straw to receive and readily discharge the hay or straw and to effect the automatic return movement of the car or elevator; and it consists of a double upwardly-inclined tramway or structure upon which the fork or car is adapted to travel, said tramway being so constructed as to cause the car or elevator to attain a perpendicular position, as well as to occupy a previous horizontal position; and it consists, also, of a weighted perpendicular lever so disposed as to act upon the fork or car after delivering its load, substantially as hereinafter more fully set forth and claimed.

In the accompanying drawings, Figure 1 is a perspective view of my improved hay or straw stacker. Fig. 2 is a side elevation thereof, and Figs. 3 and 4 are detail views of the same.

In carrying out my invention I employ an upright frame or structure, A, which is mounted upon runners $a$ to enable it to be readily transported from place to place in the field. This frame or structure is provided with a double upwardly-inclined tramway, B B', the inner one extending in a direct inclined plane from its base to its uprights, while the outer one has an angle, $b$, near its upper end, the part B having notches $b'$ at its lower end. The front uprights of the frame A have notches or shoulders $c$ on the inside, near their upper ends, to receive the rolls $d$. Just above these notches or shoulders $c$ are cross-pieces or stops $c'$, which extend from the inner tramway, B, to said uprights, they being fastened thereto.

C is the fork or car for carrying the hay or straw to be stacked. It has two rear arms, C', which have each two rolls, $d\ d'$, disposed on the inner sides thereof. The rolls $d$ travel on the inner tramway, B, and the rolls $d'$ on the outer tramway, B'. Cords or chains D are passed around pulleys $e$ on the sides of the fork or elevator C, thence over pulleys $f$ at the upper ends of the front uprights of the frame A, and finally around pulleys $g$, arranged upon and near the lower ends of said uprights. They are thence connected to a common draft-bar or whiffletree, through which the power is transmitted to cause the raising and lowering of the car or fork C.

E is a perpendicular lever with its upper end, near which it is fulcrumed or hung by an axis or pivot, E', bearing in the frame A and extending up beyond the upper end of the outer tramway, B', while its lower end is weighted, as at $h$.

It will be noticed that with the car or fork so disposed that its rolls $d$ will enter the notches $b'$ in the lower ends of the inner tramway it is ready to receive the hay or straw which may be raked thereon. Now, by applying power or draft to the cords or chains D the car or fork will be caused to travel up the double tramway, and thus elevate its contents. As its rolls $d$ reach the notches or shoulders on the inside of the front uprights of the frame A they will enter the same, while its rolls $d'$ will pass the angle $b$ of tramway B' and upon its upper side, and thus permit it to attain a perpendicular position, to enable the ready discharge of its contents and the stacking of the straw or hay. Simultaneously therewith the car or fork will be brought into contact with the upper end of the lever E, so as to deflect it from a perpendicular position, the effect of which will be, after releasing the car of the pull of the cords or chains, to cause the automatic return or descent of the car or fork past the angle $b$ of the outer tramway, whence it will further descend by gravity.

I claim and desire to secure by Letters Patent—

1. In a hay or straw stacker, the combination, with the double tramway B B', having a track, $b$, forming an obtuse angle with the part B', and the frame A, having notches or shoulders near its upper end, of the fork or car having the rear arms, C', provided with rolls and pulleys and the operating cords or chains, substantially as and for the purpose set forth.

2. In a hay or straw stacker, the combination, with the car or fork adapted to travel on the tramway of the frame, of the perpendicular weighted lever constructed and arranged to intercept the moving car, substantially as and for the purpose set forth.

In testimony whereof I affix my signature in presence of two witnesses.

JACOB H. BEAN.

Witnesses:
 WM. H. BEAN,
 ROBT. H. WOODCOCK.